(12) United States Patent
Suzuki et al.

(10) Patent No.: US 7,196,724 B2
(45) Date of Patent: Mar. 27, 2007

(54) IMAGE SIGNAL PROCESSING DEVICE, DIGITAL CAMERA AND COMPUTER PROGRAM PRODUCT THAT PERFORM WHITE BALANCE ADJUSTMENT USING PIXEL OUTPUTS FROM EXTRACTED AREAS

(75) Inventors: Masahiro Suzuki, Inzai (JP); Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 721 days.

(21) Appl. No.: 10/001,997

(22) Filed: Dec. 5, 2001

(65) Prior Publication Data

US 2002/0167596 A1 Nov. 14, 2002

(30) Foreign Application Priority Data

Dec. 8, 2000 (JP) .............................. 2000-374840
Dec. 8, 2000 (JP) .............................. 2000-374841

(51) Int. Cl.
*H04N 9/73* (2006.01)

(52) U.S. Cl. ..................... 348/223.1; 348/273; 348/587

(58) Field of Classification Search ..................... None
See application file for complete search history.

(56) References Cited

U.S. PATENT DOCUMENTS 4,794,448 A * 12/1988 Takizawa ..................... 348/277

5,319,449 A * 6/1994 Saito et al. ............... 348/223.1
5,389,969 A * 2/1995 Suzuki et al. ............ 348/223.1
5,473,375 A * 12/1995 Takayama et al. .......... 348/364
5,619,347 A * 4/1997 Taniguchi et al. .......... 358/516
6,906,744 B1 * 6/2005 Hoshuyama et al. ..... 348/223.1

FOREIGN PATENT DOCUMENTS

JP B2 2997234 10/1999

* cited by examiner

*Primary Examiner*—Ngoc-Yen Vu
*Assistant Examiner*—Hung H. Lam
(74) *Attorney, Agent, or Firm*—Oliff & Berridge PLC

(57) ABSTRACT

R, G and B signals are output from individual pixels provided at an image-capturing element. Pixel output averages corresponding to the R, G and B signals are calculated for each of partition areas into which the light-receiving surface of the image-capturing element is divided. Ratios of the R and B pixel output averages to the G pixel output average are calculated for each partition area. Then, any area with the ratios of the pixel output averages within a predetermined range is extracted from the plurality of partition areas. R and B white balance gains are calculated based upon the total sums of the pixel output averages corresponding to the individual colors in the extracted area. A white balance adjustment is then executed by multiplying the values of R and B pixel outputs by the corresponding white balance gains.

27 Claims, 12 Drawing Sheets

FIG. 3

| G | B | G | B | G | B | G | B | ... |
|---|---|---|---|---|---|---|---|---|
| R | G | R | G | R | G | R | G | ... |
| G | B | G | B | G | B | G | B | ... |
| R | G | R | G | R | G | R | G | ... |
| G | B | G | B | G | B | G | B | ... |
| R | G | R | G | R | G | R | G | ... |
| G | B | G | B | G | B | G | B | ... |

FIG. 4

| G  | Ye | G  | Ye | G  | Ye | G  | Ye | ... |
|----|----|----|----|----|----|----|----|-----|
| Cy | Ma | Cy | Ma | Cy | Ma | Cy | Ma | ... |
| G  | Ye | G  | Ye | G  | Ye | G  | Ye | ... |
| Cy | Ma | Cy | Ma | Cy | Ma | Cy | Ma | ... |
| G  | Ye | G  | Ye | G  | Ye | G  | Ye | ... |
| Cy | Ma | Cy | Ma | Cy | Ma | Cy | Ma | ... |
| G  | Ye | G  | Ye | G  | Ye | G  | Ye | ... |

IMAGE SIGNAL PROCESSING DEVICE, DIGITAL CAMERA AND COMPUTER PROGRAM PRODUCT THAT PERFORM WHITE BALANCE ADJUSTMENT USING PIXEL OUTPUTS FROM EXTRACTED AREAS

INCORPORATION OF REFERENCE

The disclosures of the following priority applications are herein incorporated by reference:
Japanese Patent Application No. 12-374840 filed Dec. 8, 2000
Japanese Patent Application No. 12-374841 filed Dec. 8, 2000

BACKGROUND OF THE INVENTION

1. Field of the Invention

The present invention relates to a device that processes an image signal input from a color image-capturing element, a digital camera and a computer program product utilized in image signal processing, which, more specifically, achieve an improvement in the white balance performance.

2. Description of the Related Art

There are image signal processing devices such as electronic still cameras and video cameras in the known art that implement white balance adjustment in order to achieve faithful reproduction of white-color areas of the subject by processing image signals obtained through an image-capturing operation executed at a color image-capturing element (see Japanese Patent Publication No. 2997234, for instance).

FIG. 14 presents a control block diagram of an image signal processing circuit achieved in the related art. Now, a brief explanation is given on the white balance adjustment implemented in the related art in reference to FIG. 14. This camera includes an image-capturing device adopting the TTL system and an image signal processing device. A subject image formed on a color image-capturing element 52 by a photographic lens 51 is converted to an electrical image signal by the color image-capturing element 52. A brightness signal Y is generated from the image signal at a brightness signal processing unit 53 and a low-frequency component YL of the brightness signal, a red-color signal R and a blue-color signal B are generated from the image signal at a chroma signal processing unit 54. The brightness signal Y is a signal achieved by mixing red R, green G and blue B at a ratio satisfying the expression below.

$$Y = 0.30\,R + 0.59\,G + 0.11\,B \quad (1)$$

The red-color signal R is multiplied by a white balance gain Rgain for the red-color signal and, as a result, a red-color signal R' is generated at an R gain control unit 55. The blue-color signal B is multiplied by a white balance gain Bgain for the blue-color signal and, as a result, a blue-color signal B' is generated at a B gain control unit 56. Next, a color difference signal R−Y is generated at a matrix amplifier 57 based upon the red-color signal R' and the low-frequency component YL of the brightness signal. In addition, a color difference signal B−Y is generated at a matrix amplifier 58 based upon the blue-color signal B' and the low-frequency component YL of the brightness signal. The color difference signals are expressed as $$R-Y = 0.70\,R - 0.59\,G - 0.11\,B \quad (2)$$

$$B-Y = 0.89\,B - 0.59\,G - 0.30\,R \quad (3)$$

These color different signals R−Y and B−Y are provided to a compression processing unit 59 where they are compressed in the JPEG format before they are recorded into a recording medium.

Averaging units 60 and 61 respectively ascertain the averages of the color difference signals R−Y and B−Y for the entire image plane. A control voltage calculation unit 62 calculates white balance gains Rgain and Bgain that will set the levels of the average signals to 0, i.e., the white balance gains Rgain and Bgain that satisfy R=B=G. As described above, the individual red-color signals R and blue-color signals B are respectively multiplied by the white balance gains Rgain and Bgain for a white balance adjustment.

However, there is a problem with the image signal processing device in the related art in that an accurate white balance adjustment cannot be achieved when photographing a scene with a subject having a chromatic color occupying a wide area of the photographic image plane, since the white balance adjustment operation is subjected to the predominant influence of the color of the subject on the photographic scene.

An object of the present invention is to achieve a good white balance even when a subject having a chromatic color takes up a wide area of the photographic image plane.

SUMMARY OF THE INVENTION

The image signal processing device that processes an image signal constituting a subject image captured at an image-capturing element comprises a saturation calculating unit that calculates a saturation level in each of a plurality of partition areas based upon pixel outputs from the partition areas into which the light-receiving surface of the image-capturing element is divided, an area extracting unit that extracts an area having a saturation level within a predetermined range and a white balance adjustment unit that performs a white balance adjustment based upon pixel outputs corresponding to the individual colors from the extracted area.

The saturation calculating unit may include an average calculating unit that calculates the pixel output averages for the individual colors based upon the pixel signals output in correspondence to the individual partition areas and an average ratio calculating unit that calculates a ratio of the pixel output average corresponding to another color to the pixel output average of a reference color for each partition area. In this case, the area extracting unit should extract an area with the ratio of the pixel output averages within a predetermined range from the plurality of partition areas.

The present invention may be constituted such that an area to be used for a white balance adjustment is selected based upon the hue of the subject image, instead.

In such a case, the image signal processing device according to the present invention that processes an image signal constituting a subject image captured at an image-capturing element comprises a hue calculating unit that calculates the hue of each of a plurality of partition areas based upon pixel outputs from partition areas into which the light-receiving surface of the image-capturing element is divided, an area extracting unit that extracts partition area with a hue manifesting a frequency equal to or lower than a predetermined frequency value from the plurality of partition areas based upon a hue frequency distribution among the plurality of partition areas and a white balance adjustment unit that performs a white balance adjustment based upon pixel outputs corresponding to the various colors from the extracted area.

The hue calculating unit may include an average calculating unit that calculates the pixel output averages for the individual colors based upon the pixel signals output in correspondence to the individual partition areas, an average ratio calculating unit that calculates a ratio of the pixel output average corresponding to another color to the pixel output average of a reference color for each partition area and a hue detecting unit that detects the hue of each partition area based upon the ratio of the pixel output averages.

The white balance adjustment unit that executes the white balance adjustment based upon the saturation levels or hues may include a total sum calculating unit that calculates the total sums of the pixel output averages corresponding to the individual colors in the extracted area, a gain calculating unit that calculates a white balance gain for a color other than the reference color based upon the total sums corresponding to the individual colors and a pixel output adjustment unit that implements a white balance adjustment by multiplying the pixel outputs corresponding to a color other than the reference color by the white balance gain.

The present invention may be adopted in a digital camera having the image signal processing device described above and a recording image-capturing element that outputs an image signal for recording the captured subject image into a recording medium. In such a digital camera, the white balance adjustment may be executed by using the image signal output by the recording image-capturing element. If the digital camera is also provided with a photometering image-capturing element that outputs photometering signals indicating the subject brightness levels in the individual photometering areas into which the photographic field is divided, the white balance adjustment may be implemented by using an image signal from the photometering image-capturing element.

The present invention may be adopted in a computer-readable computer program product that includes a program for processing an image signal constituting a subject image captured at an image-capturing element. The program in this case comprises saturation calculation processing in which the level of saturation is calculated for each of a plurality of partition area based upon pixel outputs from the partition areas into which the light-receiving surface of the image-capturing element is divided, area extraction processing in which an area having a saturation level within a predetermined range is extracted from the plurality of partition areas and white balance adjustment processing in which white balance adjustment is performed based upon pixel outputs corresponding to the various colors from the extracted area.

The saturation calculation processing may include average calculation processing in which pixel output averages are calculated for the individual colors based upon pixel signals output in correspondence to the individual partition areas and average ratio calculation processing in which a ratio of the pixel output average corresponding to another color to the pixel output average corresponding to a reference color is calculated for each partition area. In such a case, any area where the ratio of the pixel output averages is within a predetermined range is extracted from the plurality of partition areas.

If an area to be used for white balance adjustment is selected based upon the hue of the subject image, the image signal processing program in the computer-readable computer program product according to the present invention comprises hue calculation processing in which the hue of each of a plurality of partition areas is calculated based upon pixel outputs from the partition areas into which the light-receiving surface of the image-capturing element is divided, area extraction processing in which any partition area with a hues manifesting a frequency equal to or lower than a predetermined frequency value is extracted from the plurality of partition areas based upon a hue frequency distribution among the plurality of partition areas and white balance adjustment processing in which a white balance adjustment is executed based upon pixel outputs corresponding to various colors from the extracted area.

The hue calculation processing may include average calculation processing in which pixel output averages are calculated for the individual colors based upon pixel signals output in correspondence to the individual partition areas into which the light-receiving surface of the image-capturing element is divided, average ratio calculation processing in which a ratio of the pixel output average corresponding to another color to the pixel output average corresponding to a reference color is calculated for each partition area and hue detection processing in which the hue of each partition area is detected based upon the ratio of the pixel output average values.

The white balance processing executed based upon saturation levels or hues may include total sum calculation processing in which the total sums of the pixel output averages corresponding to the individual colors in the extracted area are calculated, gain calculation processing in which a white balance gain for a color other than the reference color is calculated based upon the total sums corresponding to the individual colors and pixel output adjustment processing in which a white balance adjustment is executed by multiplying the pixel outputs corresponding to a color other than the reference color by the white balance gain.

The computer program product may be realized as a recording medium having recorded therein the program or a carrier wave on which the program is embodied as a data signal.

In the computer program product described above, too, the image signal utilized for white balance adjustment may be an image signal for recording the captured subject image into a recording medium or it may be photometering signals indicating the subject brightness levels in the individual photometering areas into which the photographic field is divided.

The pixel outputs from the image-capturing element may include a red-color component, a green-color component and a blue color component or may include a green-color component, a yellow-color component, a cyan-color component and a magenta-color component. In either case, the green color is the reference color.

BRIEF DESCRIPTION OF THE DRAWINGS

FIG. 3 shows an example of the R, G and B pixel arrangement that may be adopted at color image-capturing element;

FIG. 4 shows a pixel array with complementary color filters at the color image-capturing element;

DETAILED DESCRIPTION OF THE PREFERRED EMBODIMENTS

First Embodiment

Now, in reference to FIGS. 1~7, an embodiment achieved by adopting the present invention in a TTL single lens reflex electronic still camera is explained. It is to be noted that the present invention may be adopted in any of various types of electronic still cameras employing an electronic viewfinder in which an image is captured by a color image-capturing element such as a CCD, video cameras, scanners and the like, as well as in the TTL single lens reflex electronic still camera.

Figure 1:
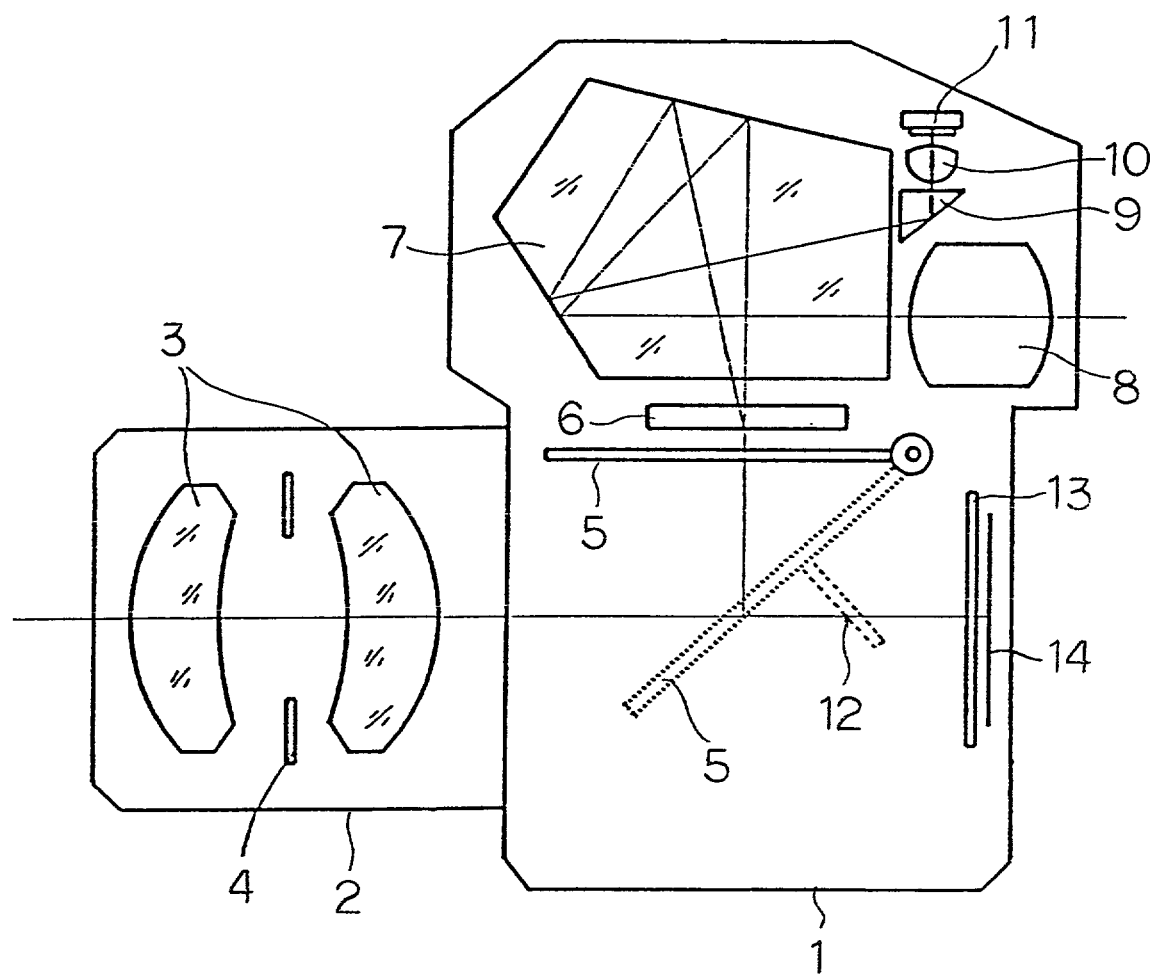
FIG. 1 is a cross sectional view of an embodiment achieved by mounting the image signal processing device according to the present invention at a camera.

In FIG. 1, the TTL single lens reflex camera includes a camera body 1 and an interchangeable lens barrel 2 mounted at the camera body 1. Light from a subject enters the lens barrel 2 and is guided to the camera body 1 after passing through a photographic lens 3 and an opening of an aperture 4 inside the lens barrel 2.

A main mirror 5 is provided at the camera body 1. The main mirror 5 is set at the position indicated by the dotted line unless the camera is engaged in a photographing operation, and the subject light is reflected at the main mirror 5 and is guided to a finder mat 6 where a subject image is formed. The subject image is then guided to an eyepiece lens 8 by a pentaprism 7 and is observed by the photographer via the eyepiece lens 8.

The subject image formed on the finder mat 6 is guided by the pentaprism 7 and a prism 9 to an image-forming lens 10 which re-forms the subject image on a photometering image-capturing element 11. The photometering image-capturing element 11, which is constituted of a photodiode or a CCD, measures the subject brightness in each of a plurality of photometering areas into which the photographic field is divided.

The main mirror 5 is moved to the position indicated by the solid line for a photographing operation. Subject light having been transmitted through a sub-mirror 12 passes through a released shutter 13 and is guided to a photographing image-capturing element 14 where a subject image is formed. Some of the subject light is reflected by the sub-mirror 12 and is guided to a focal point detection device (not shown) installed at the bottom of the camera body 1 to enable detection of the focal adjustment state of the photographic lens 3.

At the photographing image-capturing element (CCD) 14, a plurality of photoelectric conversion elements, i.e., pixels, are arrayed on a plane. A red R, green G or blue B color filter is provided on each pixel, as shown in FIG. 3. An image-capturing element having a complementary color filters for green G, yellow Ye, cyan Cy and magenta Ma as illustrated in FIG. 4 may be employed instead. An image-capturing element having such color filters is referred to as a color image-capturing element in this specification.

Figure 2:
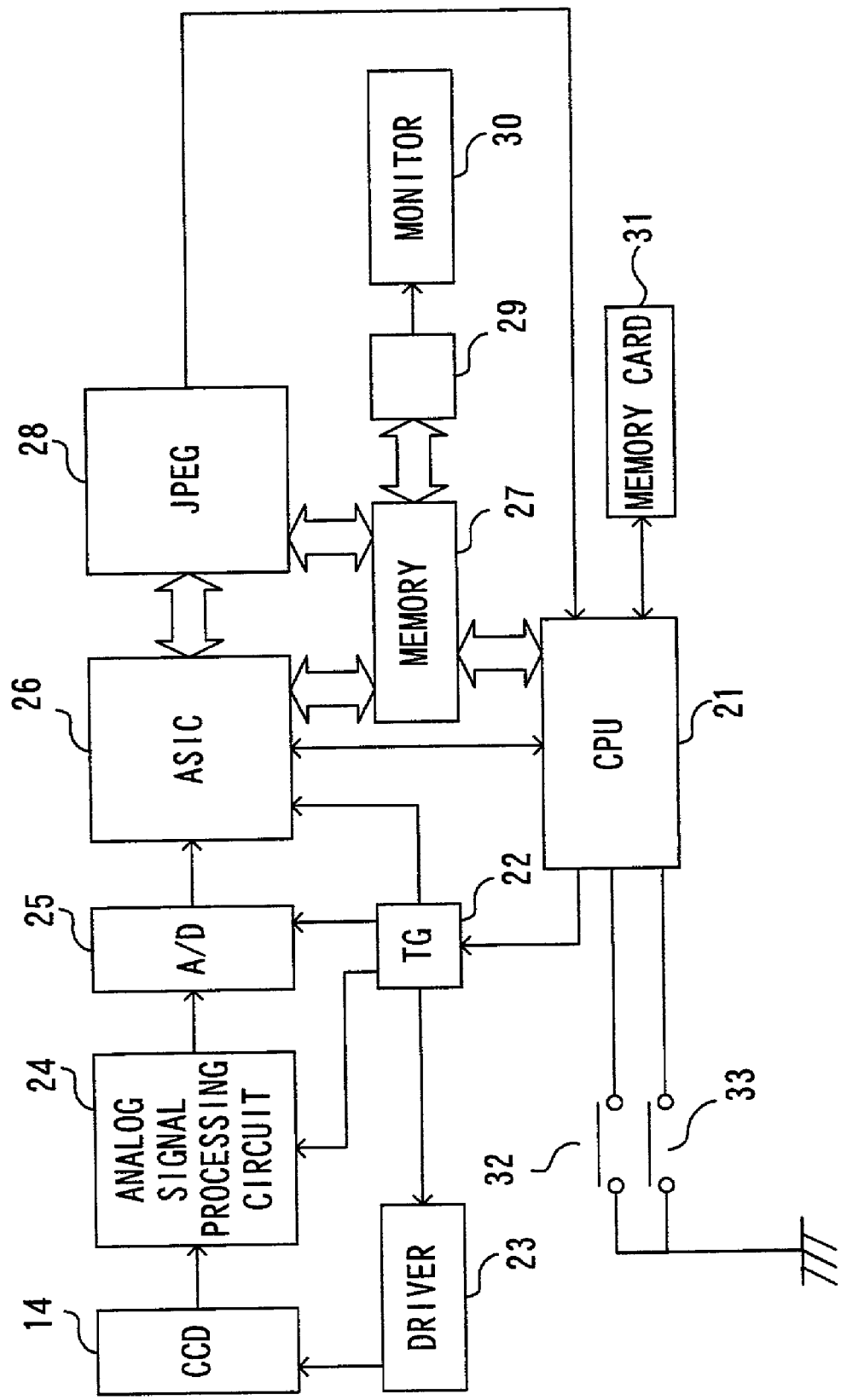
FIG. 2 presents a block diagram of the control circuits of the camera shown in FIG. 1.

A CPU 21 in FIG. 2 controls the overall operations in the camera. The CPU 21 drives the photographing color image-capturing element (CCD) 14 described above by controlling a timing generator (TG) 22 and a driver 23. In addition, the CPU 21 controls the timing generator 22 to control an analog signal processing circuit 24, an A/D converter 25, an image processing circuit (ASIC) 26 and a buffer memory 27.

The analog signal processing circuit 24 implements analog processing such as gain control and noise reduction on analog R, G and B signals input from the color image-capturing element 14. The A/D converter 25 converts the analog R, G and B signals to digital signals. The image processing circuit (ASIC) 26 implements processing such as white balance adjustment, γ correction and interpolation contour correction on the digital R, G and B signals. The operation executed by the image processing circuit 26 is to be detailed later.

Image data undergoing the image processing or having undergone the processing are stored into the buffer memory 27. A compression circuit (JPEG) 28 compresses the image data stored in the buffer memory 27 at a predetermined rate through the JPEG method. A display image generating circuit 29 generates display image data from the image data stored in the buffer memory 27 and displays the display image at a monitor 30. The compressed image data are recorded into a memory card 31 which may be constituted of, for instance, a flash memory. A half press switch 32 and a full press (shutter release) switch 33 provided in conjunction with a shutter release button are connected to the CPU 21.

Each time the shutter 13 is released and a photograph is taken, the CPU 21 controls the color image-capturing element 14 to store electrical charges and the read out the stored charges. The read out stored charges then undergo the signal processing at the analog signal processing circuit 24 and the digital conversion at the A/D converter 25. Therefore, they are processed at the image processing circuit 26. Then, the captured image is displayed at the monitor 30, the image is compressed at the compression circuit 28 and the compressed image is recorded into the memory card 31.

Figure 5:
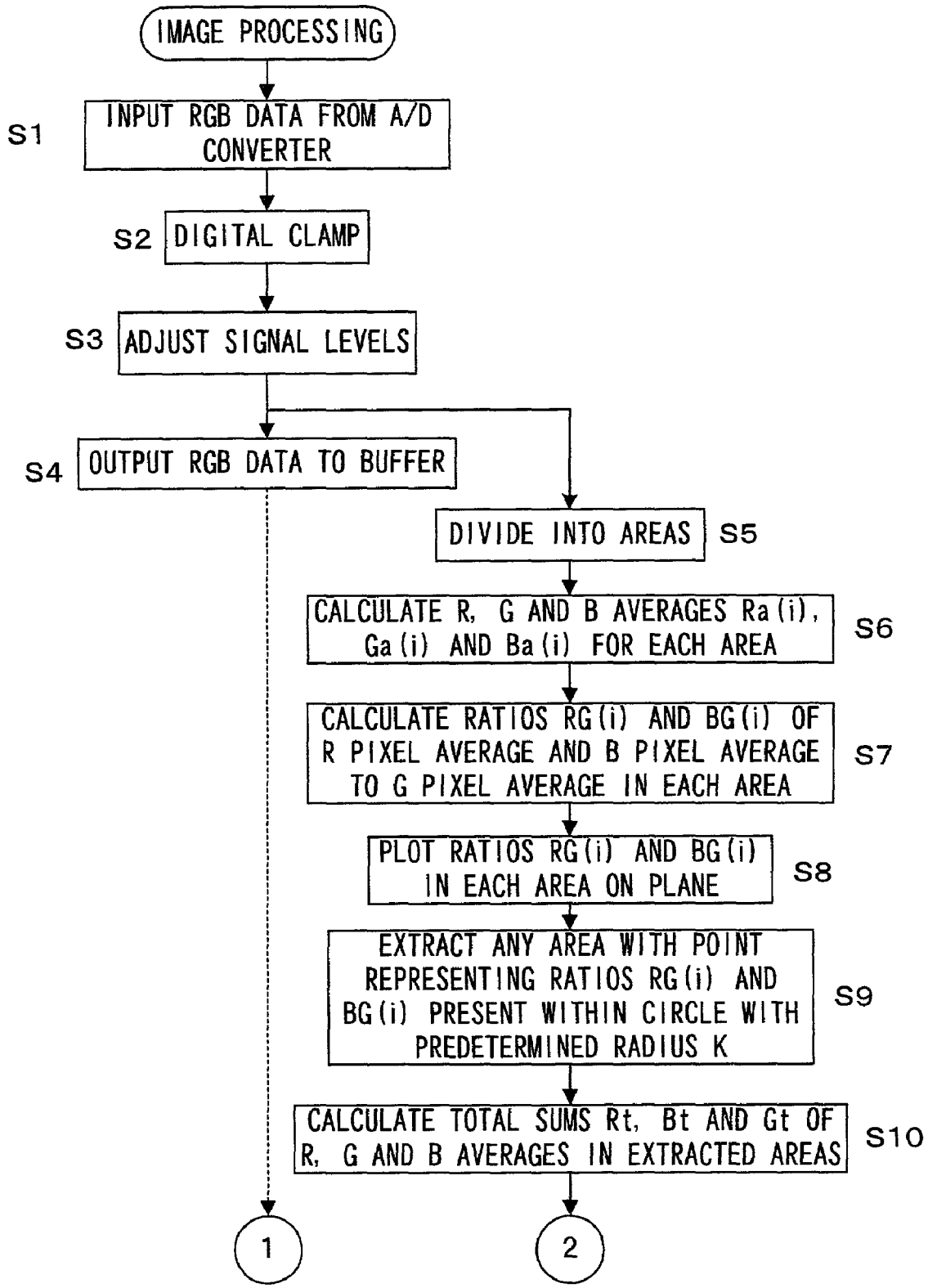
FIG. 5 presents a flowchart of an example of the image processing.
Figure 6:
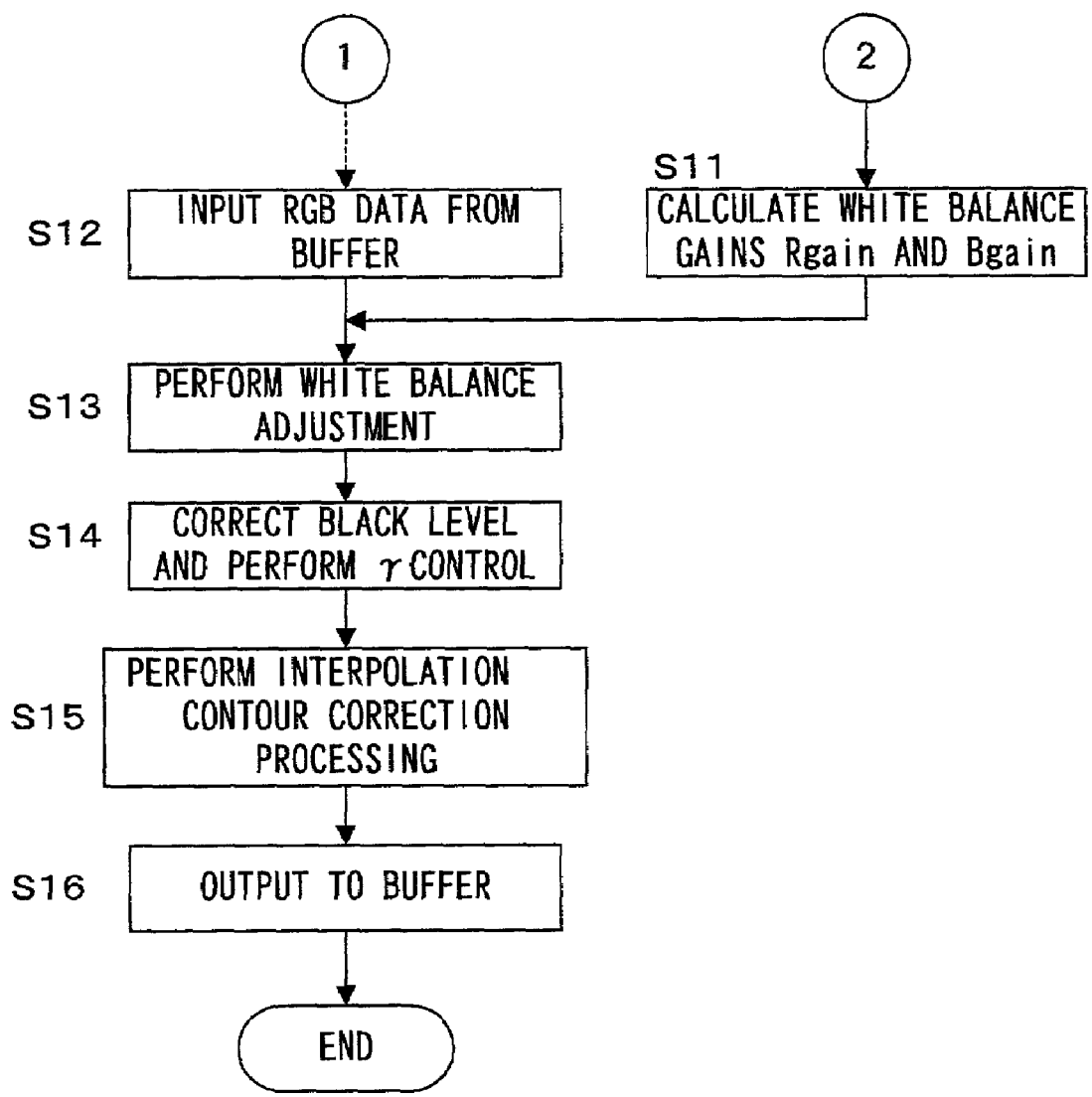
FIG. 6 presents a flowchart of the image processing in continuation from FIG. 5.

The image processing circuit (ASIC) 26, constituted of a CPU and its peripheral components, processes R, G and B image signals by executing the image processing program shown in FIGS. 5 and 6. It is to be noted that while the image processing is executed in software at a microcomputer in the embodiment, the image processing may be executed in hardware instead.

In step S1, individuals sets of pixel data corresponding to R, G and B obtained by converting the outputs from the color image-capturing element 14 to digital signals at the A/D converter 25 are input. In the following step S2, a weighted average of a plurality of sets of pixel data to be used as an optical black is subtracted from the individual sets of pixel data in each line in the pixel array. In step S3, the individual sets of pixel data corresponding to R, G and B in each line of the pixel array are uniformly multiplied by a predetermined gain for a signal level adjustment and also for a correction of any inconsistency of the sensitivity levels of the R and B pixels relative to the sensitivity of the G pixels.

In step S4, the RGB pixel data having undergone the processing described above are output to the buffer memory 27 for storage, and in steps S5~S11, white balance gains Rgain and Bgain are calculated based upon the RGB pixel data having undergone the processing.

Now, the method adopted to calculate the white balance gains Rgain and Bgain is explained. First, the light-receiving surface of the image-capturing element 14 having a plurality of pixels arrayed on plane is divided into a plurality of areas each containing at least two pixels in step S5. This area division may be achieved through one of the following methods.

1. A method achieved by dividing the light-receiving surface into areas containing equal quantities of pixels to one another in principle, while disallowing any overlapping of the divided areas.
2. A method achieved by dividing the light-receiving surface into areas containing equal quantities of pixels to one another in principle, while allowing overlapping of the divided areas.
3. A method achieved by dividing the light-receiving surface into areas containing different quantities of pixels, with areas at the center of the photographic image plane having a small quantity of pixels and areas in the periphery of the photographic image plane having a large quantity of pixels, i.e., with small central areas and larger peripheral areas.
4. A method achieved by dividing the light-receiving surface into large areas for an initial arithmetic operation and then dividing the light-receiving surface into smaller areas based upon the results of the arithmetic operation, i.e., a method in which the area size is changed based upon the results of the arithmetic operation.
5. A method achieved by combining the methods above.

The method that may be employed for area division is not limited to that adopted in the embodiment.

The division method 2, which allows overlapping of the areas, enables calculation of more accurate white balance gains compared to the division method 1, which does not allow overlapping. In the division method 3, small areas are set at the center and larger areas are set at the periphery since a main subject to be photographed is present at the central area of the photographic image plane with greater frequency. It is possible to achieve more accurate white balance gains by executing more precise arithmetic processing on the central areas containing the main subject than on the peripheral areas containing the background such as the sky. By adopting the division method 4, in which the arithmetic operation is initially performed by dividing the light-receiving surface into large areas and an arithmetic operation is re-executed by dividing the light-receiving surface into smaller areas if reliable results cannot be obtained through the initial arithmetic operation, the length of time required for the arithmetic processing can be reduced.

Individual areas obtained by dividing the light-receiving surface into n areas through any of the methods described above are assigned with area numbers i (=1~n) for identification. In step S6, averages Ra(i), Ga(i) and Ba(i) of pixel values corresponding to R, G and B in each area i are calculated. A pixel value represents the level of the voltage output from a given pixel, i.e., a brightness value. The voltage levels may be within a range of 0~255, for instance. In step S7, a ratio RG(i) of the R pixel average Ra(i) to the G pixel average Ga(i) and a ratio BG(i) of the B pixel average Ba(i) to the G pixel average Ga(i) in each area i are calculated through the following formulae.

$$RG(i)=\{Ra(i)-Ga(i)\}/Ga(i) \quad (4)$$

$$BG(i)=\{Ba(i)-Ga(i)\}/Ga(i) \quad (5)$$

Figure 7:
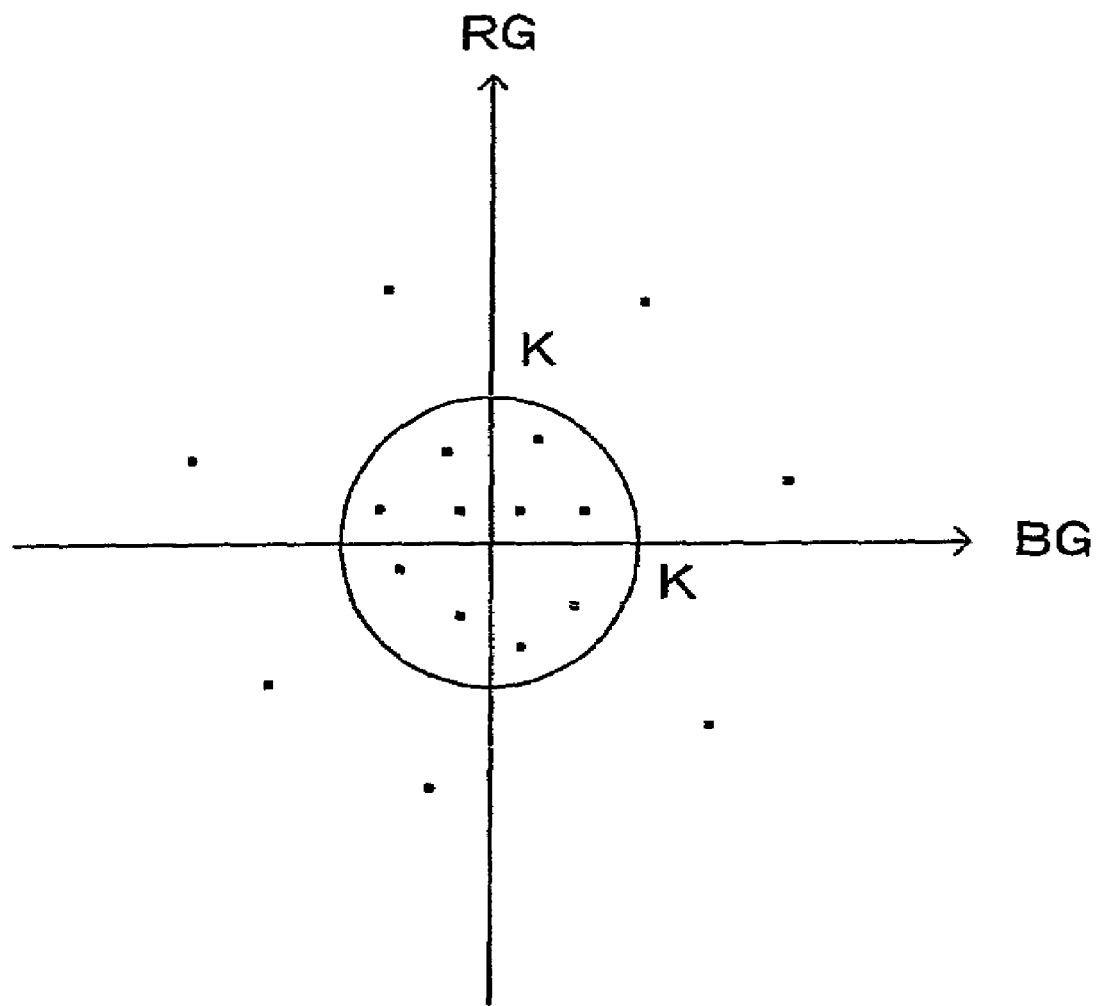
FIG. 7 shows the pixel average ratios RG and BG in the camera achieved in a first embodiment, mapped on a plane.

In step S8, a point {RG(i), BG(i)} which is determined by the ratio RG(i) and the ratio BG(i) in each area i obtained through the arithmetic operation is plotted on a plane with its horizontal axis representing the ratio BG of the B pixel average to the G pixel average and its vertical axis representing the ratio RG of the R pixel average to the G pixel average, as shown in FIG. 7.

The position at which the point {RG(i), BG(i)} corresponding to the area i is plotted on the plane coordinate system of the ratio RG of the R pixel average to the G pixel average and the ratio BG of the B pixel average to the G pixel average represents the level of saturation of the subject in the area i. For instance, if blue sky is present within the photographic image plane, the ratio BG in an area containing the blue sky is high, whereas the ratio RG becomes higher when photographing a red rose garden. It is difficult to achieve good white balance when photographing a scene with a chromatic subject with a high saturation level taking up a large area of the photographic image plane due to the intense effect of the color of the subject. Accordingly, it is judged that a chromatic subject with a high saturation level is present in an area with the ratios RG and BG of the pixel averages exceeding a predetermined value K and this area is excluded from the white balance gain calculation in the embodiment. Consequently, the white balance adjustment is implemented by excluding a chromatic subject with a high saturation level from the photographic image plane, which makes it possible to obtain good adjustment results.

More specifically, in step S9, any areas i with the corresponding points {RG(i), BG(i)} present inside a circle with a radius K around the center (0, 0) on the plane shown in FIG. 7 are extracted. Namely, areas i satisfying the following expression are extracted.

$$\sqrt{\{|RG(i)|^2+|BG(i)|^2\}} \leq K \quad (6)$$

In step S10, the total sums of the averages corresponding to R, G and B pixels in all extracted areas are calculated through the following formulae.

$$Rt=\Sigma Ra(i) \quad (7)$$

$$Gt=\Sigma Ga(i) \quad (8)$$

$$Bt=\Sigma Ba(i) \quad (9)$$

In step S11, the white balance gains Rgain and Bgain are calculated through the following formulae based upon the total sums Rt, Bt and Gt.

$$Rgain=Rt/Gt \quad (10)$$

$$Bgain=Bt/Gt \quad (11)$$

Once the white balance gains Rgain and Bgain are calculated, the RGB pixel data stored earlier into the buffer memory 27 are input from the buffer memory 27 in step S12. Then, a white balance adjustment is executed by multiplying all the R pixel values by the gain Rgain and by multiplying all the B pixel values by the gain Bgain.

In step S14 following the white balance adjustment, black level adjustment and γ correction in the known art are executed. Next, in step S15, interpolation/contour correction processing in the known art is performed in units of areas each containing p (down)×q (across) pixels. Namely, the image data having undergone the white balance adjustment are formatted in preparation for JPEG data compression in units of individual sets of block data each corresponding to a pixel area of p×q pixels and a γ signal for an areas of p1×q1 pixels and a Cb signal and a Cy signal corresponding to areas of p2×q2 pixels are generated as a result. Since the black level adjustment, the γ correction, the interpolation/contour correction processing described above are of the known art and do not bear direct relevance to the present invention, their detailed explanation is omitted. Lastly, the Y signal, the Cb signal and the Cy signal are output to the buffer memory 27 for storage in step S16.

As explained above, in the first embodiment;

(1) the light-receiving surface of the color image-capturing element 14 is divided into a plurality of areas i, (2) the pixel output averages Ra(i), Ga(i) and Ba(i) corresponding to R, G and B colors in each area i are calculated, (3) the ratios RG(i) and BG(i) of the pixel output averages Ra(i) and Ba(i) corresponding to the other colors R and B to the pixel output average Ga(i) corresponding to the green color G are calculated for each area i, (4) any area having the ratios RG(i) and BG(i) of the pixel output averages indicating a point within the predetermined range K is extracted from the plurality of areas, and (5) a white balance adjustment is executed based upon the pixel outputs corresponding to the individual colors in the extracted area.

As a result, good white balance is achieved even when a chromatic subject takes up a large area of the photographic image plane for the reason detailed below.

As explained earlier, the position of the point {RG(i), BG(i)} of a given area i on the plane coordinates of the ratio RG of the R pixel average to the G pixel average and the ratio BG of the B pixel average to the G pixel average indicates the saturation level of the subject in the area i. For instance, an area containing blue sky in the photographic image plane has a larger ratio BG, whereas the ratio RG becomes higher when photographing a rose garden with red roses. Good white balance cannot be achieved when photographing a scene with a chromatic subject with a high saturation level taking up a large area of the photographic image plane due to the intense effect of the color in the subject of the photographic scene.

In the embodiment, an area with either the ratio RG or the ratio BG of the pixel averages exceeding the predetermined value K is judged to contain a chromatic subject with a high saturation level and such an area is excluded from the white balance gain calculation. In other words, areas achieving saturation levels within a predetermined range, i.e., saturation levels within the circle over the radius K as expressed in expression (6), are extracted from the plurality of areas i, and a white balance adjustment is executed based upon the pixel outputs corresponding to the individual colors from the extracted areas. As a result, the white balance adjustment is executed by excluding a chromatic subject with a high saturation level from the photographic image plane and thus, good adjustment results are achieved.

It is to be noted that the predetermined value K is a reference value that may be determined as explained below. Namely, the predetermined value K is set in advance so as to achieve good white balance adjustment for a photograph with a large chromatic area contained in the photographic image plane by taking a large number of test photographs each with a large chromatic area present within the photographic image plane under various photographing conditions.

Second Embodiment

Figure 8:
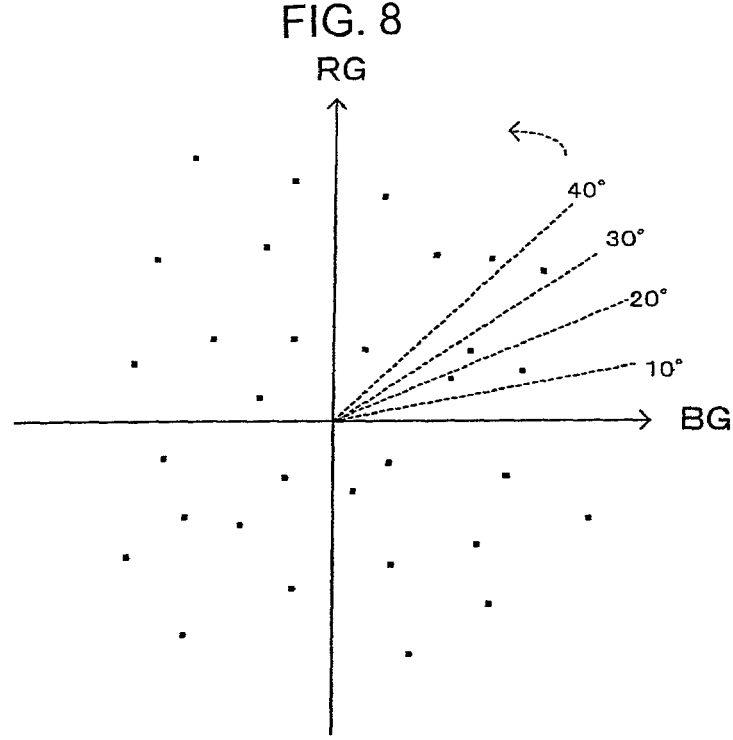
FIG. 8 shows the pixel average ratios RG and BG in the camera achieved in a second embodiment, mapped on a plane.
Figure 9:
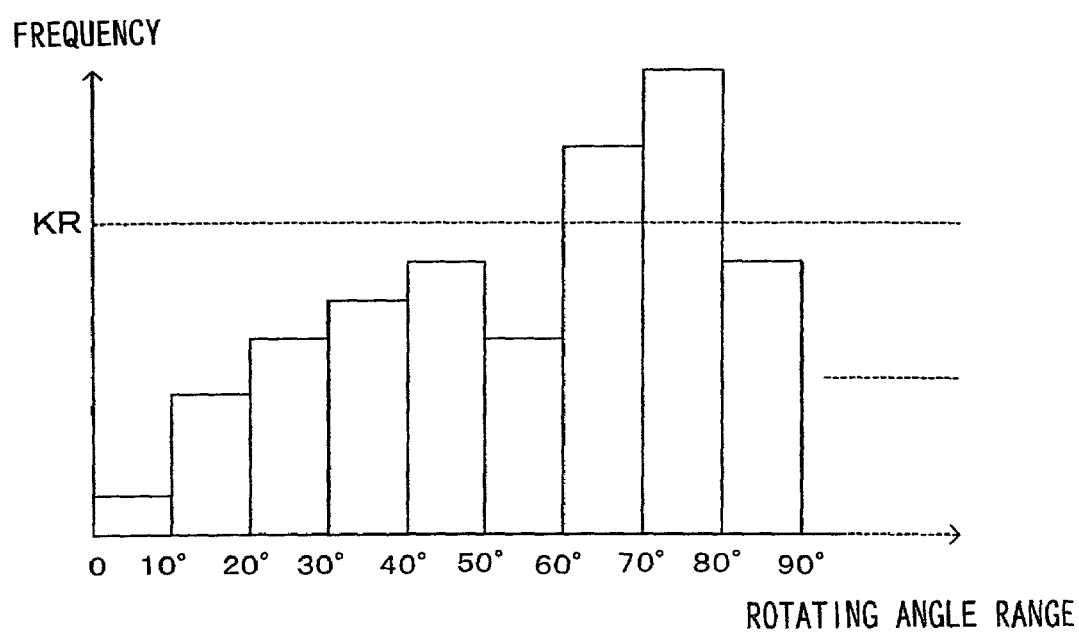
FIG. 9 presents a histogram in correspondence to various rotating angle ranges in for the camera achieved in the second embodiment.

In the first embodiment, any area with the ratios RG and BG of the pixel averages exceeding the predetermined value K, as illustrated in FIG. 7, is judged to contain a chromatic subject with a high saturation level and such an area is excluded from the white balance gain calculation. In the second embodiment, a histogram such as that shown in FIG. 9 is prepared by ascertaining the frequency distribution of points {RG(i), BG(i)} corresponding to different rotating angle ranges relative to the origin point (0, 0) on the plane coordinate system shown in FIG. 8, which is similar to that presented in FIG. 7, and any area to be excluded from the white balance gain calculation is determined by judging the presence/absence of a chromatic color in the area based upon the histogram, instead.

Figure 10:
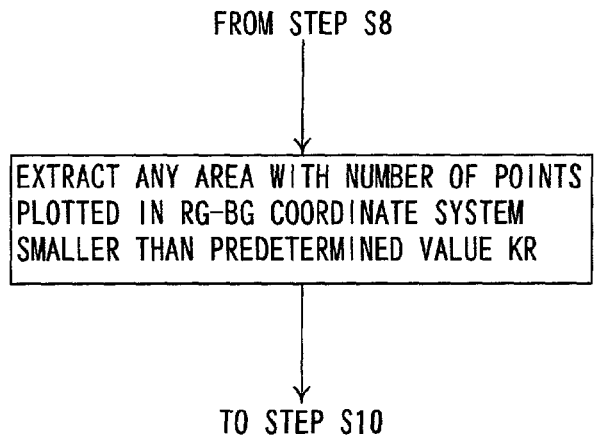
FIG. 10 shows step S9A executed instead of step S9 in FIG. 5.
Figure 11:
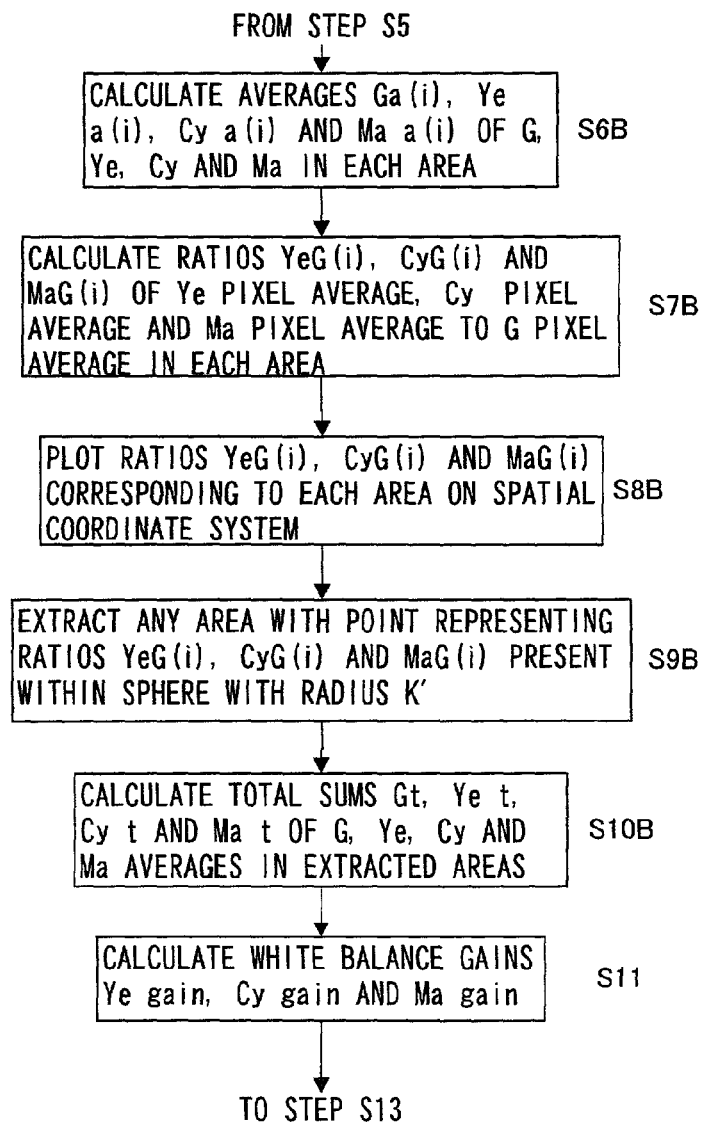
FIG. 11 presents a flowchart of the white balance gain calculation processing implemented in a third embodiment, which corresponds to the flowchart presented in FIGS. 5 and 6.

In reference to the flowchart in FIGS. 5 and 6 and in the flowchart in FIG. 10, an explanation is now given by focusing on the difference from the first embodiment. In step S8, a point {RG(i), BG(i)} determined by the ratio RG(i) and the ratio BG(i) of each area i obtained through the arithmetic operation is plotted on the plane coordinate system with its horizontal axis representing the ratio BG of the B pixel average to the G pixel average and its vertical axis representing the ratio RG of the R pixel average to the G pixel average. In step S9A (see FIG. 10), a histogram such as that shown in FIG. 9 is prepared by ascertaining the frequency distribution of points {RG (i), BG (i)} in each rotating angle range relative to the origin point (0, 0) on the plane coordinate system in FIG. 8. It is to be noted that while an explanation is given in reference to the embodiment on an example in which each rotating angle range represents a 10° angle, the angle represented by each rotating angle range may be other than 10°.

The position of the point {RG(i), BG(i)} corresponding to a given area i on the plane coordinate system of the ratio RG of the R pixel average to the G pixel average and the ratio BG of the B pixel average to the G pixel average represents the identity of the chromatic color of the subject in the area i, i.e., the hue of the subject in the area i. The frequency distribution of points {RG(i), BG(i)} for each rotating angle range indicates the subject hue tendency. For instance, the ratio BG becomes higher if blue sky takes up a large area in the photographic image plane, resulting in a high frequency of points {RG(i), BG(i)} present in the rotating angle ranges around the horizontal axis BG. The ratio RG becomes higher when photographing a rose garden with many red roses in full bloom, and in such a case, the frequency of points {RG(i), BG(i)} present in the rotating angle ranges near the vertical axis RG increases.

However, a good white balance cannot be achieved when photographing a scene with a chromatic subject taking up a large area of the photographic image plane as described above due to the intense effect of the color of the subject. Accordingly, an area i with a hue manufacturing with a value exceeding a predetermined frequency value KR is judged to contain a chromatic subject which takes up a large area of the photographic image plane and such an area is excluded from the white balance gain calculation in the embodiment. Consequently, the white balance adjustment can be executed by excluding the chromatic subject taking up a large area of the photographic image plane, which makes it possible to achieve good adjustment results.

More specifically, any area i with a frequency value equal to or lower than the predetermined value KR in the histogram shown in FIG. 9 is extracted in step S10, and then in the following step S11, the total sums Rt, Gt and Bt of the averages of the R, G and B pixel values in all the extracted areas are calculated through formulae (7)~(9) presented earlier. In step S12, white balance gains Rgain and Bgain are calculated through formulae (10) and (11) based upon the total sums Rt, Gt and Bt.

Once the white balance gains Rgain and Bgain are calculated, the RGB pixel data stored earlier into the buffer memory 27 are input from the buffer memory 27 in step S12. Then, a white balance adjustment is executed by multiplying all the R pixel values by the gain Rgain and by multiplying all the B pixel values by the gain Bgain.

As explained above, in the second embodiment;
(1) the light-receiving surface of the color image-capturing element 14 is divided into a plurality of areas i,
(2) the pixel output averages Ra(i), Ga(i) and Ba(i) corresponding to R, G and B colors in each area i are calculated and the ratios RG(i) and BG(i) of the pixel output averages Ra(i) and Ba(i) corresponding to the other colors R and B to the pixel output average Ga(i) corresponding to the reference color G are calculated for each area i,
(3) the hue of the area i is detected based upon the ratios RG(i) and BG(i) of the pixel output averages,
(4) any area with a hue manufacturing with a frequency equal to or lower than the predetermined frequency value KR is extracted from the plurality of areas i based upon the hue frequency distribution among the plurality of areas i and
(5) a white balance adjustment is executed based upon the pixel outputs corresponding to the individual colors in the extracted area.

As a result, a good white balance is achieved even when a chromatic subject takes up a large area of the photographic image plane in the image data undergoing the white balance adjustment.

In the embodiment described above, the subject hue tendency in each area is judged by setting a plane coordinate system of the ratio RG of the R pixel average to the G pixel average and the ratio BG of the B pixel average to the G pixel average. However, the present invention may be realized by using any coordinate system other than the coordinate system described above, such as an XYZ coordinate system, an LAB coordinate system, an LUV coordinate system or an HSC coordinate system, as long as the coordinate system represents hues.

In the first and second embodiments described above, the white balance adjustment is executed by using the outputs from the photographing color image-capturing element 14. However, similar advantages can be achieved by executing the white balance adjustment explained above with the outputs from the photometering color image-capturing element 11 as well.

An explanation has been given above in reference to the embodiment on an example in which the image-capturing element includes three primary color filters corresponding to R, G and B colors with green color used as the reference color. However, the colors of the filters, their arrangement and the color used for reference at the color image-capturing element are not limited to those in the embodiment, and similar advantages can be achieved by employing an image-capturing element having, for instance, complementary color filters in G, Ye, Cy and Ma.

(Variation; When Employing an Image-capturing Element with Complementary Color Filters)

A white balance adjustment is executed as described below in a camera that employs an image-capturing element having complementary color filters, as illustrated in FIG. 4. In step S5 in FIG. 5, the light-receiving surface is divided into a plurality of areas through the division method explained earlier. Next, in step S6, averages Ga(i), Ye$_{13}$ a(i), Cy_a(i) and Ma_a(i) of the pixel values respectively corresponding to green G, yellow Ye, cyan Cy and magenta Ma in each partition area i are calculated.

In step S7, a ratio YeG(i) of the Ye pixel average Ye_a(i) to the G pixel average Ga(i), a ratio CyG(i) of the Cy pixel average Cy_a(i) to the G pixel average Ga(i) and a ratio MaG(i) of the Ma pixel average Ma_a(i) to the G pixel average Ga(i) in each area i are calculated through the following formulae;

$$YeG(i)=\{Ye\_a(i)-2Ga(i)\}/2Ga(i) \quad (12)$$

$$CyG(i)=\{Cy\_a(i)-2Ga(i)\}/2Ga(i) \quad (13)$$

$$MaG(i)=\{Ma\_a(i)-2Ga(i)\}/2Ga(i) \quad (14)$$

In step S8, a point: {YeG(i), CyG(i), MaG(i)} which is determined by the ratios YeG(i), CyG(i) and MaG(i) corresponding to each area i obtained through the arithmetic operation is plotted on a spatial coordinate system constituted of three axes with an X axis representing the ratio YeG of the Ye pixel average to the G pixel average, a Y axis representing the ratio CyG of the Cy pixel average to the G pixel average and a Z axis representing the ratio MaG of the Ma pixel average to the G pixel average. In step S9, any area i with its point {YeG(i), CyG(i), MaG(i)} present within a sphere with a radius K' around the center (0, 0, 0) on the space coordinate system is extracted. In other words, any area i that satisfies the following expression is extracted.

$$\sqrt{\{|YeG(i)|^2+|CyG(i)|^2+|MaG(i)|^2\}} \leq K' \quad (15)$$

In step S10, the total sums of the averages of the pixel values corresponding to G, Ye, Cy and Ma in all the extracted areas are calculated through the following formulae.

$$Gt=\Sigma Ga(i) \quad (16)$$

$$Ye\_t=\Sigma Ye\_a(i) \quad (17)$$

$$Cy\_t=\Sigma Cy\_a(i) \quad (18)$$

$$Ma\_t=\Sigma Ma\_a(i) \quad (20)$$

In step S11, white balance gains Ye_gain, Cy_gain and Ma_gain are calculated through the following formulae based upon the total sums Gt, Ye_t, Cy_t and Ma_t.

$$Ye\_gain=Ye\_t/2Gt \quad (21)$$

$$Cy\_gain=Cy\_t/2Gt \quad (22)$$

$$Ma\_gain=YMa\_t/2Gt \quad (23)$$

Once the white balance gains Ye_gain, Cy_gain and Ma_gain are calculated, the complementary color pixel data having been stored in advance at the buffer memory 27 are input from the buffer memory 27 and a white balance adjustment is executed by multiplying the values corresponding to all the Ye pixels by the gain Ye_gain, multiplying the values corresponding to all the Cy pixels by the gain Cy_gain and multiplying the values corresponding to all the Ma pixels by the gain Ma_gain in step S12.

An explanation is given above on the examples in which the present invention is adopted in an electronic still camera. However, raw image data, which have been obtained through a photographing operation performed in an electronic still camera, are taken into the personal computer and a white balance adjustment may be executed as described above on a personal computer. Such raw image data may be utilized by, for instance, recording image data having undergone the processing in step S3 in FIG. 5 into a recording medium.

Figure 12:
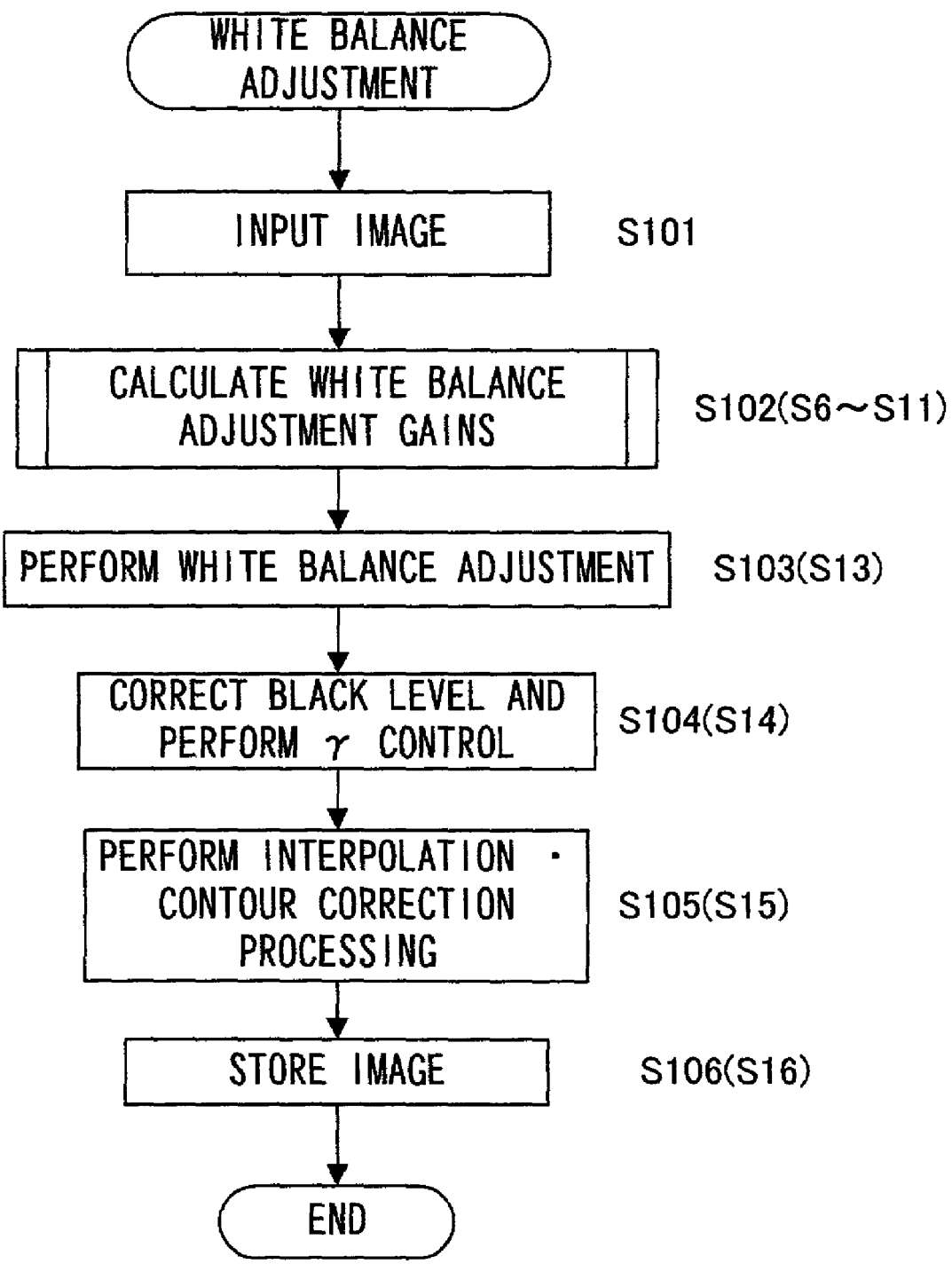
FIG. 12 presents a flowchart of an example of the image processing program that may be utilized when executing the white balance adjustment according to the present invention on a personal computer.

FIG. 12 shows an example of an image processing program that may be used to execute a white balance adjustment on a personal computer. In step S101, raw image data recorded in a removable recording medium are input to a storage area in, for instance, a hard disk of the personal computer. In step S102, white balance adjustment gains are calculated by executing the processing in steps S6~S11 explained earlier in reference to FIGS. 5 and 6, for instance. In step S103, the image data values corresponding to the individual pixels are multiplied by the gains that have been calculated, as in step S13. Subsequently, the processing in steps S103~S105 (corresponding to steps S13~S15 explained earlier) is executed and then in step S106, an image having undergone the white balance adjustment is recorded into the removable recording medium.

When the present invention is adopted to execute a white balance adjustment on a personal computer, the image processing program shown in FIG. 12 may be provided in a recording medium such as a CD-ROM or through a data signal on the Internet or the like.

Figure 13:
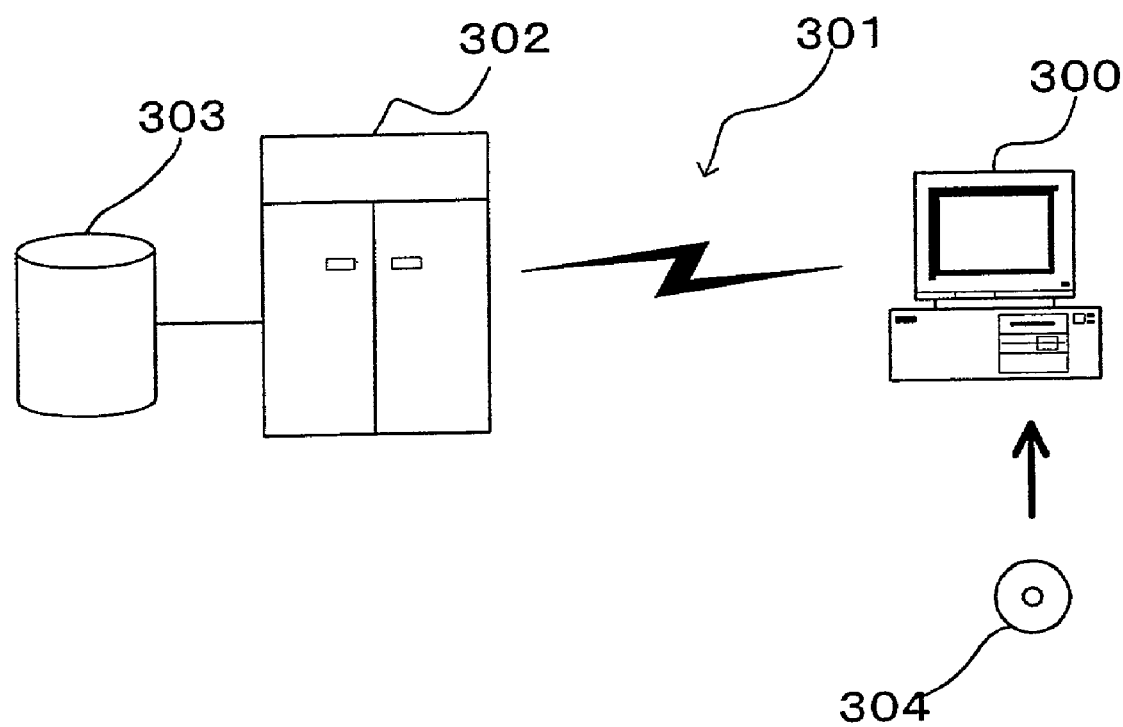
FIG. 13 illustrates various modes in which the image processing program may be provided to a personal computer.
Figure 14:
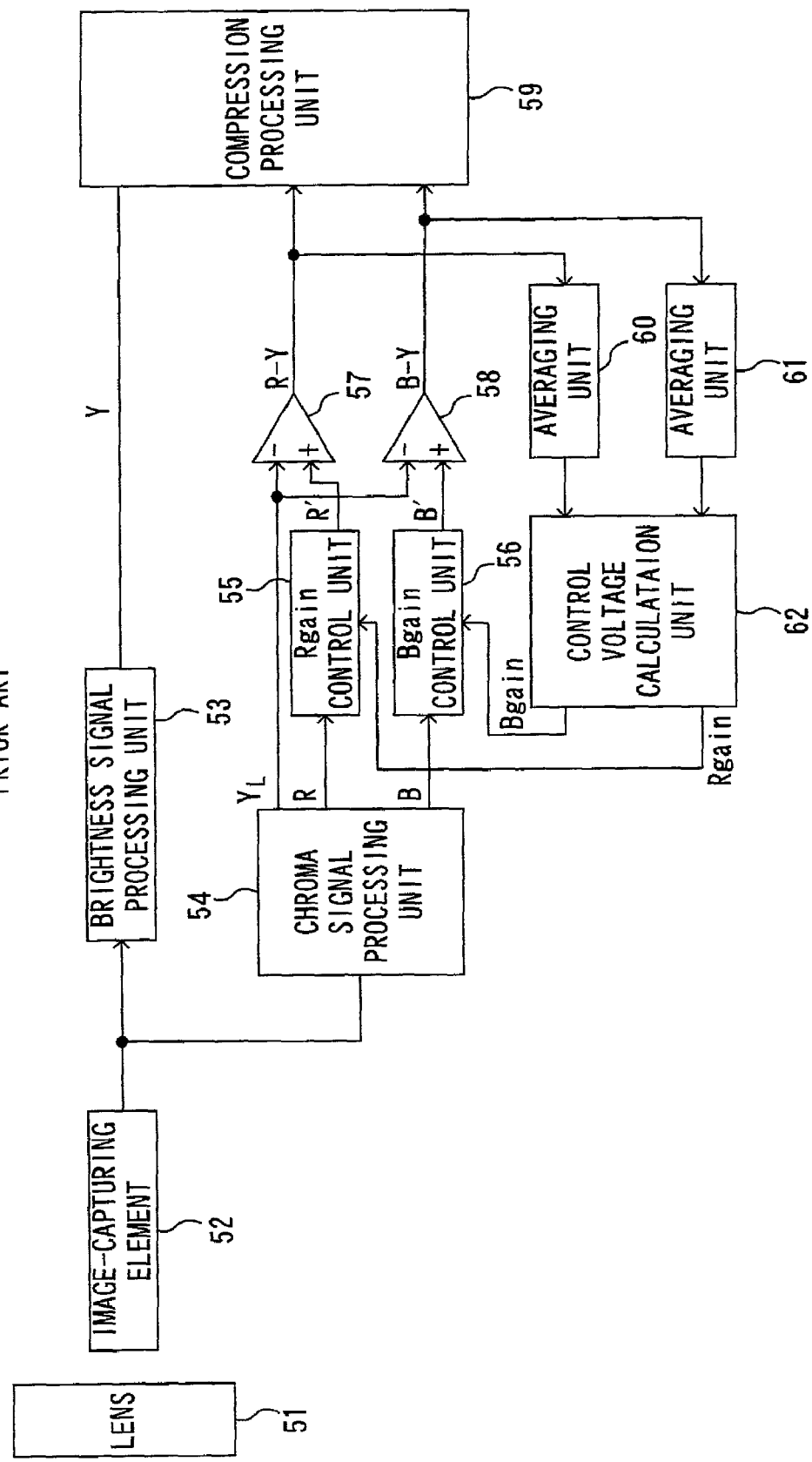
FIG. 14 shows the structure adopted in an image processing device in the related art.

FIG. 13 illustrates how this may be achieved. A computer 300 receives the program via a CD-ROM 304. The personal computer 300 can be connected with a communication line 301. A computer 302 is a server computer that provides the program stored in a recording medium such as a hard disk 303. The communication line 301 may be a communication line through which Internet communication or personal computer communication may be implemented or it may be a dedicated communication line. The computer 302 reads out the program from the hard disk 303 and then transmits the program to the personal computer 300 via the communication line 301.

In other words, the program which is embodied as a data signal on a carrier wave is transmitted via the communication line 301. Thus, the program can be provided as a computer-readable computer program product in any of various modes such as a recording medium and a carrier wave.

The white balance adjustment processing in an electronic still camera is sometimes upgraded after the camera is marketed. In such a case, too, the image processing program shown in FIGS. 5 and 6 can be distributed in a CD-ROM or through the internet.

What is claimed is:

1. An image signal processing device that processes an image signal constituting a subject image captured at an image-capturing element, comprising:
    an average calculating unit that calculates pixel output averages for individual colors in each of a plurality of partition areas into which a light-receiving surface of the image-capturing element is divided based upon the image signal;
    an average ratio calculating unit that calculates a ratio of the pixel output average corresponding to another color to the pixel output average of a reference color for each partition area;
    a hue detecting unit that detects a hue of each partition area based upon the ratio of the pixel output averages;
    an area extraction unit that extracts any partition area with a hue manifesting a frequency equal to or lower than a predetermined frequency value from the plurality of partition areas based upon a hue frequency distribution among the plurality of partition areas; and
    a white balance adjustment unit that performs white balance adjustment based upon pixel outputs corresponding to individual colors from the extracted area.

2. An image signal processing device according to claim 1, wherein:
    the white balance adjustment unit further includes:
    a total sum calculating unit that calculates total sums of pixel output averages corresponding to the individual colors in the extracted area;
    a gain calculating unit that calculates a white balance gain for a color other than the reference color based upon the total sums corresponding to the individual colors; and
    a pixel output adjustment unit that performs white balance adjustment by multiplying pixel outputs corresponding to the color other than the reference color by the white balance gain.

3. An image signal processing device according to claim 1, wherein:
    the pixel outputs include a red-color component, a green-color component and a blue color component and the reference color is green.

4. An image signal processing device according to claim 1, wherein:
    the pixel outputs include a green-color component, a yellow-color component, a cyan-color component and a magenta-color component and the reference color is green.

5. An image signal processing device according to claim 1, wherein:
    the pixel outputs include a red-color component, a green-color component and a blue color component and the reference color is green.

6. An image signal processing device according to claim 2, wherein:
    the pixel outputs include a green-color component, a yellow-color component, a cyan-color component and a magenta-color component and the reference color is green.

7. A digital camera having:
    an image signal processing device according to claim 1; and
    a recording image-capturing element that outputs an image signal used for recording the captured subject image into a recording medium, wherein:
    an image signal to be used for white balance adjustment is the image signal output by the recording image-capturing element.

8. A digital camera having:
    an image signal processing device according to claim 1;
    a recording image-capturing element that outputs an image signal for recording the captured subject image into a recording medium; and
    a photometering image-capturing element that outputs a photometering signal indicating a subject brightness level in each of photometering areas into which a photographic field is divided, wherein:
    an image signal to be used for white balance adjustment is the image signal output by the photometering image-capturing element.

9. A computer readable medium storing thereon a computer program comprising a set of instructions, when executed by a computer, the computer program to be used to process an image signal constituting a subject image captured at an image-capturing element, with the program comprising instructions to perform:

average value calculation processing in which pixel output averages are calculated for individual colors in each of a plurality of partition areas into which a light-receiving surface of the image-capturing element is divided based upon the image signal;

average ratio calculation processing in which a ratio of the pixel output average corresponding to another color to the pixel output average corresponding to a reference color is calculated for each partition area;

hue detection processing in which a hue of each partition area is detected based upon the ratio of the pixel output averages;

area extraction processing in which any partition area with a hue manifesting a frequency equal to or lower than a predetermined frequency value is extracted from the plurality of partition areas based upon a hue frequency distribution among the plurality of partition areas; and white balance adjustment processing in which a white balance adjustment is performed based upon pixel outputs corresponding to individual colors from the extracted area.

10. A computer readable medium storing thereon a computer program comprising a set of instructions according to claim 9, wherein:

the pixel outputs include a red-color component, a green-color component and a blue color component and the reference color is green.

11. A computer readable medium storing thereon a computer program comprising a set of instructions according to claim 9, with the program further comprising instructions to perform:

total sum calculation processing in which total sums of the pixel output averages corresponding to the individual colors in the extracted area are calculated;

gain calculation processing in which a white balance gain for a color other than the reference color is calculated based upon the total sums corresponding to the individual colors; and pixel output adjustment processing in which a white balance adjustment is performed by multiplying pixel outputs corresponding to the color other than the reference color by the white balance gain.

12. A computer readable medium storing thereon a computer program comprising a set of instructions according to claim 11, wherein:

the pixel outputs include a red-color component, a green-color component and a blue color component and the reference color is green.

13. A computer readable medium storing thereon a computer program comprising a set of instructions according to claim 9, wherein:

the pixel outputs include a green-color component, a yellow-color component, a cyan-color component and a magenta-color component and the reference color is green.

14. A computer readable medium storing thereon a computer program comprising a set of instructions according to claim 11, wherein:

the pixel outputs include a green-color component, a yellow-color component, a cyan-color component and a magenta-color component and the reference color is green.

15. A computer readable medium storing thereon a computer program comprising a set of instructions according to claim 9, wherein:

an image signal to be utilized in white balance adjustment is an image signal used for recording the captured subject image into a recording medium.

16. A computer readable medium storing thereon a computer program comprising a set of instructions according to claim 9, wherein:

an image signal to be utilized in white balance adjustment is a photometering signal indicating subject brightness levels each corresponding to one of a plurality of photometering areas into which a photographic field is divided.

17. An image signal processing device that processes an image signal constituting a subject image captured at an image-capturing element, comprising:

a hue calculating unit that calculates a hue of each of a plurality of partition areas based upon pixel outputs from the partition areas into which a light-receiving surface of the image-capturing element is divided;

an area extracting unit that extracts any area having a hue manifesting a frequency equal to or lower than a predetermined frequency value from the plurality of partition areas based upon a hue frequency distribution among the plurality of partition areas; and a white balance adjustment unit that performs a white balance adjustment based upon pixel outputs corresponding to the individual colors from the extracted area, wherein the white balance adjustment is not based upon pixel outputs from any area that was not extracted by the area extracting unit.

18. A digital camera having:

an image signal processing device according to claim 17; and a recording image-capturing element that outputs an image signal for recording the captured subject image into a recording medium, wherein:

an image signal to be used for white balance adjustment is the image signal output by the recording image-capturing element.

19. A digital camera having:

an image signal processing device according to claim 17;

a recording image-capturing element that outputs an image signal for recording the captured subject image into a recording medium; and a photometering image-capturing element that outputs a photometering signal indicating a subject brightness level in each of photometering areas into which a photographic field is divided, wherein:

an image signal to be used for white balance adjustment is the image signal output by the photometering image-capturing element.

20. A computer readable medium storing thereon a computer program comprising a set of instructions, when executed by a computer, the computer program to be used to process an image signal constituting a subject image captured at an image-capturing element, with the program comprising instructions to perform:

hue calculation processing in which a hue of each of a plurality of partition areas is calculated based upon pixel outputs from the partition areas into which a light-receiving surface of the image-capturing element is divided;

area extraction processing in which any area manifesting a frequency equal to or lower than a predetermined frequency value is extracted from the plurality of partition areas based upon a hue frequency distribution among the plurality of partition areas; and white balance adjustment processing in which white balance adjustment is performed based upon pixel outputs corresponding to individual colors from the extracted area, wherein the white balance adjustment is not based upon pixel outputs from any area that was not extracted by the area extraction processing.

21. An image signal processing device that processes an image signal constituting a subject image captured at an image-capturing element, comprising:

an average calculating unit that calculates pixel output averages for individual colors in each of a plurality of partition areas into which a light-receiving surface of the image-capturing element is divided based upon the image signal;

an average ratio calculating unit that calculates a ratio of the pixel output average corresponding to another color to the pixel output average of a reference color for each partition area;

a hue detecting unit that detects a hue of each partition area based upon the ratio of the pixel output averages;

an area extraction unit that extracts any partition area with a hue manifesting a frequency equal to or lower than a predetermined frequency value from the plurality of partition areas based upon a hue frequency distribution among the plurality of partition areas; and a white balance gain calculating unit that calculates white balance gains based upon pixel outputs corresponding to individual colors from the extracted area.

22. An image signal processing device according to claim 21, wherein:

the pixel outputs include a red-color component, a green-color component and a blue color component and the reference color is green.

23. A digital camera having:

an image signal processing device according to claim 21;

a recording image-capturing element that outputs an image signal for recording the captured subject image into a recording medium; and a photometering image-capturing element that outputs a photometering signal indicating a subject brightness level in each of photometering areas into which a photographic field is divided, wherein:

an image signal to be used for calculation of a white balance gain is the image signal output by the photometering image-capturing element.

24. A computer readable medium storing thereon a computer program comprising a set of instructions, when executed by a computer, the computer program to be used to process an image signal constituting a subject image captured at an image-capturing element, with the program comprising instructions to perform:

average value calculation processing in which pixel output averages are calculated for individual colors in each of a plurality of partition areas into which a light-receiving surface of the image-capturing element is divided based upon the image signal;

average ratio calculation processing in which a ratio of the pixel output average corresponding to another color to the pixel output average corresponding to a reference color is calculated for each partition area;

hue detection processing in which a hue of each partition area is detected based upon the ratio of the pixel output averages;

area extraction processing in which any partition area with a hue manifesting a frequency equal to or lower than a predetermined frequency value is extracted from the plurality of partition areas based upon a hue frequency distribution among the plurality of partition areas; and white balance gain calculation processing in which white balance gains are calculated based upon pixel outputs corresponding to individual colors from the extracted area.

25. An image signal processing device that processes an image signal constituting a subject image captured at an image-capturing element, comprising:

a hue calculating unit that calculates a hue of each of a plurality of partition areas based upon pixel outputs from the partition areas into which a light-receiving surface of the image-capturing element is divided;

an area extracting unit that extracts any area having a hue manifesting a frequency equal to or lower than a predetermined frequency value from the plurality of partition areas based upon a hue frequency distribution among the plurality of partition areas; and a white balance gain calculating unit that calculates white balance gains based upon pixel outputs corresponding to the individual colors from the extracted area, wherein the white balance gain is not based upon pixel outputs from any area that was not extracted by the area extracting unit.

26. A digital camera having:

an image signal processing device according to claim 25;

a recording image-capturing element that outputs an image signal for recording the captured subject image into a recording medium; and a photometering image-capturing element that outputs a photometering signal indicating a subject brightness level in each of photometering areas into which a photographic field is divided, wherein:

an image signal to be used for calculation of a white balance gain is the image signal output by the photometering image-capturing element.

27. A computer readable medium storing thereon a computer program comprising a set of instructions, when executed by a computer, the computer program to be used to process an image signal constituting a subject image captured at an image-capturing element, with the program comprising instructions to perform:

hue calculation processing in which a hue of each of a plurality of partition areas is calculated based upon pixel outputs from the partition areas into which a light-receiving surface of the image-capturing element is divided;

area extraction processing in which any area manifesting a frequency equal to or lower than a predetermined frequency value is extracted from the plurality of partition areas based upon a hue frequency distribution among the plurality of partition areas; and white balance gain calculation processing in which white balance gains are calculated based upon pixel outputs corresponding to individual colors from the extracted area, wherein the white balance gain is not based upon pixel outputs from any area that was not extracted by the area extraction processing.

* * * * *